(12) United States Patent
Gupta et al.

(10) Patent No.: US 12,175,494 B2
(45) Date of Patent: *Dec. 24, 2024

(54) TECHNOLOGIES FOR DETERMINING AND DISPLAYING VISUALS ASSOCIATED WITH EARNING DIGITAL REWARDS

(71) Applicant: FETCH REWARDS, LLC, Chicago, IL (US)

(72) Inventors: Aviral Gupta, Foster City, CA (US); David Berk, Las Vegas, NV (US); Bridget Schroeder, Fitchburg, WI (US); Brock Gibson, Columbia, MO (US); Dylan Ray Boss, Chicago, IL (US); Bennett Fortier, Chappaqua, NY (US); Ayo Jimoh, Chicago, IL (US); Erin Fuller, Madison, WI (US); Birk Cooper, Madison, WI (US)

(73) Assignee: FETCH REWARDS, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/667,549

(22) Filed: May 17, 2024

(65) Prior Publication Data
US 2024/0338728 A1 Oct. 10, 2024

Related U.S. Application Data

(63) Continuation of application No. 18/297,093, filed on Apr. 7, 2023, now Pat. No. 12,020,280.

(51) Int. Cl.
*G06Q 30/02* (2023.01)
*G06Q 30/0242* (2023.01)
*G06Q 30/0251* (2023.01)

(52) U.S. Cl.
CPC ..... *G06Q 30/0242* (2013.01); *G06Q 30/0254* (2013.01)

(58) Field of Classification Search
None
See application file for complete search history.

(56) References Cited

U.S. PATENT DOCUMENTS

| 7,070,501 B2 | 7/2006 | Cormack et al. |
| 10,549,187 B2 * | 2/2020 | Sano ............ A63F 13/25 |

(Continued)

FOREIGN PATENT DOCUMENTS

| CN | 113687829 A | 11/2021 |
| WO | WO-2019/094058 A1 | 5/2019 |

OTHER PUBLICATIONS

Wang, Hao, and Chuen-Tsai Sun. "Game reward systems: Gaming experiences and social meanings." DiGRA conference. vol. 114. (Year: 2011).*

(Continued)

*Primary Examiner* — Michael Bekerman
*Assistant Examiner* — Christopher C Busch
(74) *Attorney, Agent, or Firm* — MARSHALL, GERSTEIN & BORUN LLP

(57) ABSTRACT

Systems and methods for determining whether and how to present digital animations in a user interface are disclosed. According to certain embodiments, the systems and methods may facilitate the identification of a set of products or services purchased by an individual, and the determination of a reward level associated with the set of products or services. The systems and methods may select a digital animation, from a set of digital animations that is predetermined based on a set of probabilities, corresponding to the reward level, and present the digital animation in a user interface.

20 Claims, 8 Drawing Sheets

(56) References Cited

U.S. PATENT DOCUMENTS

| | | |
|---|---|---|
| 11,488,195 B1 | 11/2022 | Jacoby et al. |
| 2013/0060621 A1 | 3/2013 | Walker et al. |
| 2016/0058337 A1* | 3/2016 | Blahnik ............... A61B 5/1123 |
| 2019/0103137 A1 | 4/2019 | Raju et al. |
| 2023/0093817 A1 | 3/2023 | Ahi |
| 2023/0206462 A1 | 6/2023 | Yu et al. |

OTHER PUBLICATIONS

International Search Report and Written Opinion for Application No. PCT/US2024/023174, mailing date of Jun. 25, 2024.
Adrien-Luc Sanders. Introduction to Vector Animation. Lifewire. com. https://www.lifewire.com/introduction-to-vector-animation-140890#:-:text=Vector%20animation%20refers%20to%20animation,instead%20of%20stored%20pixel%20values. (Year: 2020).

* cited by examiner

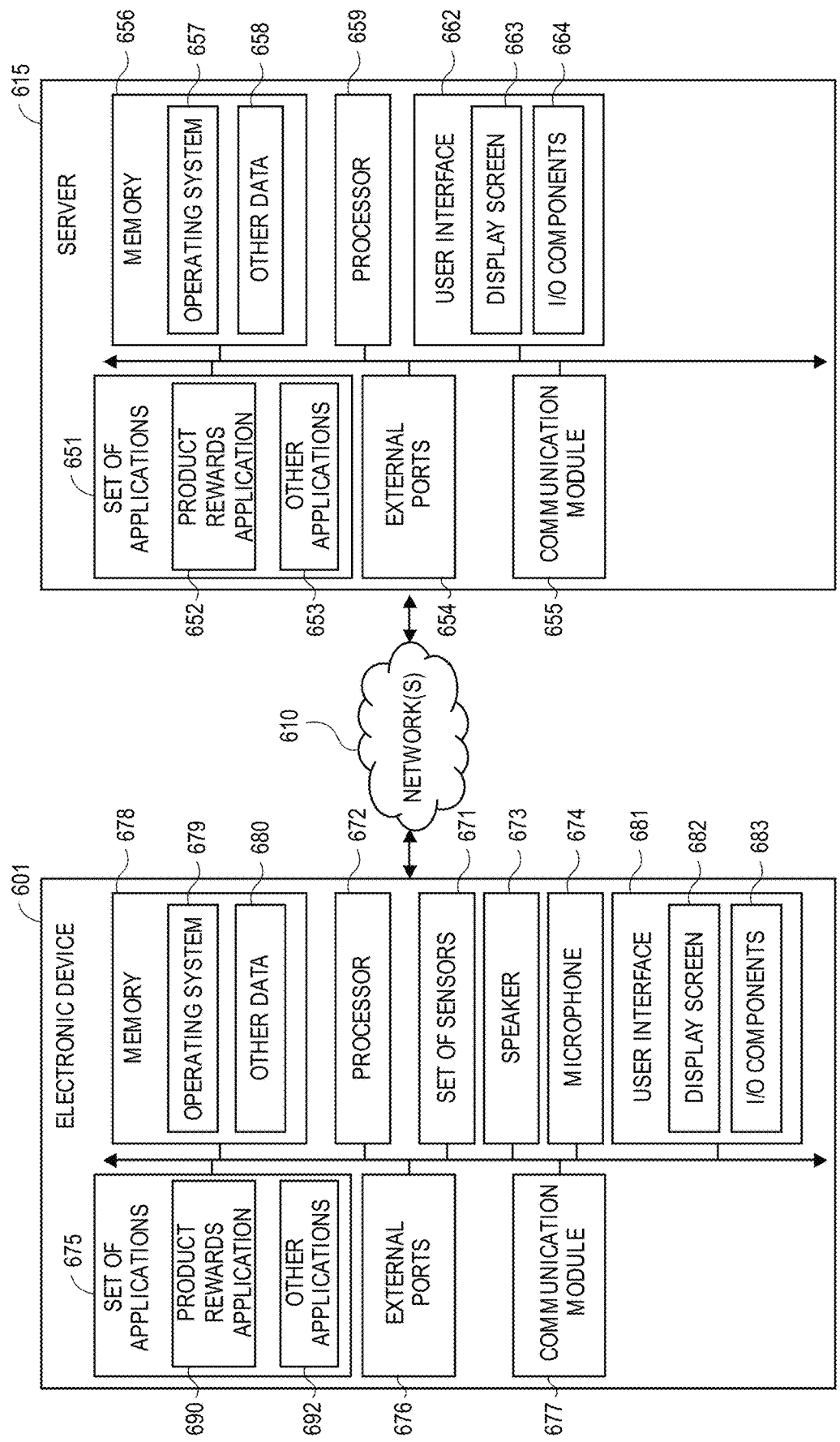

TECHNOLOGIES FOR DETERMINING AND DISPLAYING VISUALS ASSOCIATED WITH EARNING DIGITAL REWARDS

CROSS-REFERENCE TO RELATED APPLICATIONS

This application is a continuation of U.S. patent application Ser. No. 18/297,093, filed Apr. 7, 2023, the disclosure of which is hereby incorporated by reference in its entirety.

FIELD

The present disclosure is directed to systems and methods for presenting visual content associated with digital rewards on electronic devices. More particularly, the present disclosure is directed to platforms and technologies for efficiently and effectively presenting visual content associated with digital rewards based on a set of probabilities and in response to user actions, such as to improve user engagement.

BACKGROUND

Users interact with a variety of web or mobile sites or applications on a daily basis. For example, certain sites or applications facilitate digital rewards for users, such as in association with the purchase of products by the users. Generally, it is beneficial to operators of these sites or applications to increase user engagement, as this may lead to increased revenue, improved user retention, an enhanced user experience, and greater insight into user behavior, among other benefits. As a result, these operators develop ways to increase user engagement.

One such manner to increase user engagement is to use visuals that are displayed in operating the site or application, where the visuals may be especially used in contexts that are responsive to users performing some action or earning some benefit. However, conventional visual display techniques are static and predicable, which can actually end up leading to decreased user engagement. For example, conventional visual display techniques are monotonous and can lead to a lack of motivation by users, a reduced sense of personalization, and user frustration, among other drawbacks. Additionally, conventional techniques are confined to an available set of displayable content that is fixed because of bandwidth and memory limitations.

Accordingly, there is an opportunity for platforms and technologies for dynamically and effectively determining what visual content to display and for efficiently causing the visual content to be displayed via electronic devices.

SUMMARY

In an embodiment, a computer-implemented method in an electronic device of presenting digital animations is provided. The computer-implemented method may include: storing, in a memory of the electronic device, a plurality of digital animations; receiving, via a user interface of the electronic device, a selection of a digital reward functionality; in response to receiving the selection, selecting, by a computer processor of the electronic device, a subset of the plurality of digital animations, wherein the subset of the plurality of digital animations respectively corresponds to a set of reward levels; transmitting, by the computer processor to a server, a set of data identifying a product or service purchased by an individual; receiving, by the computer processor from the server, an indication of a reward level, of the set of reward levels, associated with the product or service purchased by the individual; and presenting, via the user interface, a digital animation, of the subset of the plurality of digital animations, that corresponds to the reward level.

In another embodiment, an electronic device for presenting digital animations is provided. The electronic device may include a memory storing a set of computer-readable instructions and a plurality of digital animations, a user interface, a transceiver configured to connect to a server via a network connection, and one or more processors interfaced with the memory, the transceiver, and the user interface. The one or more processors may be configured to execute the set of computer-readable instructions to cause the one or more processors to: receive, via the user interface, a selection of a digital reward functionality, in response to receiving the selection, select a subset of the plurality of digital animations, wherein the subset of the plurality of digital animations respectively corresponds to a set of reward levels, transmit, to the server via the transceiver, a set of data identifying a product or service purchased by an individual, receive, from the server via the transceiver, an indication of a reward level, of the set of reward levels, associated with the product or service purchased by the individual, and cause the user interface to present a digital animation, of the subset of the plurality of digital animations, that corresponds to the reward level.

Further, in an embodiment, a non-transitory computer-readable storage medium configured to store instructions executable by one or more processors is provided. The instructions may include: instructions for storing, in a memory, a plurality of digital animations; instructions for receiving, via a user interface, a selection of a digital reward functionality; instructions for, in response to receiving the selection, selecting a subset of the plurality of digital animations, wherein the subset of the plurality of digital animations respectively corresponds to a set of reward levels; instructions for transmitting, to a server, a set of data identifying a product or service purchased by an individual; instructions for receiving, from the server, an indication of a reward level, of the set of reward levels, associated with the product or service purchased by the individual; and instructions for presenting, via the user interface, a digital animation, of the subset of the plurality of digital animations, that corresponds to the reward level.

BRIEF DESCRIPTION OF THE FIGURES

FIG. 6 is an example hardware diagram of an electronic device and a server configured to perform various functionalities, in accordance with some embodiments.

DETAILED DESCRIPTION

Figure 1:
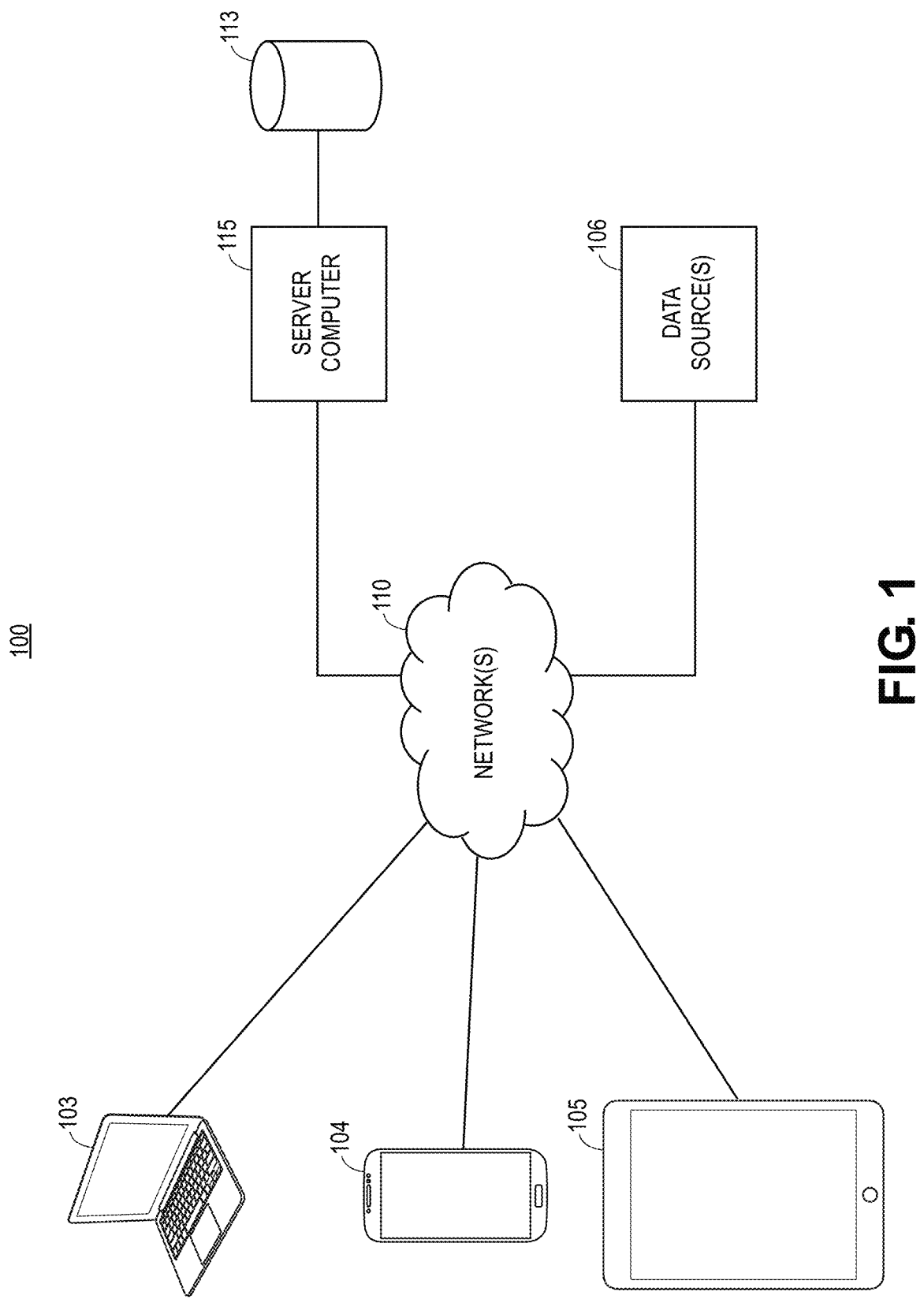
FIG. 1 depicts an overview of components and entities associated with the systems and methods, in accordance with some embodiments.

The present embodiments may relate to, inter alia, systems and methods for efficiently storing digital animations and dynamically determining whether and how to present the digital animations. According to certain aspects, an electronic device may locally store a set of digital animations to potentially present via a user interface. In response to a user action (e.g., a user purchasing a set of products), a reward level may be determined for that user action, and the electronic device may determine whether to present a digital animation for that reward level as well as determine which digital animation to present based on a set of probabilities associated with a set of rarity levels for that reward level.

Conventionally, developers structure applications to consistently present the same content, such as digital animations, in association with use of the applications. However, this leads to decreased user engagement in several ways. In particular, users may become disengaged or disinterested in using the application if they repeatedly see the same content, as users are less likely to feel a sense of novelty or excitement. Further, if the content does not change, users may feel that they have exhausted all that the application has to offer, which may also lead to reduced motivation to continue using it. Additionally, if the content is predictable, users may be less likely to explore the application and discover new features or content, which may result in reduced engagement and a limited understanding of the capabilities of the application. The combined effect may be users that are less likely to use the application regularly and fewer instances of the users recommending the application to others, thus limiting its growth and success.

There are several technical limitations associated with an electronic device having to store and present pre-configured content, such as digital animations, especially when the content is retrieved from a server and presented in response to a user action. In particular, electronic devices (e.g., smartphones) often have limited storage space compared to desktop computers or servers, which can make it challenging to store large amounts of pre-configured content, especially if the pre-configured content is composed of certain file types that occupy a large amount of storage. This can limit the number of animations or other content that can be stored on the device. Further, in situations in which the pre-configured content needs to be retrieved from a server, network latency can cause delays in retrieving and ultimately presenting the content, which can result slow loading times and interrupted playback. Additionally, if the content is large or the user is on a slow or limited data plan, the content may take a long time to load or the user may be unable to access it altogether. Further still, certain content such as digital animations may be composed of large and complex electronic files (e.g., flash file format or GIFs) which consume a lot of local memory and processing power associated with the retrieval and presentation of the digital animations. Moreover, pre-configured content may not be compatible with all devices or platforms, which can limit the reach of the content and reduce its effectiveness.

The systems and methods represent an improvement on these technologies, namely digital content retrieval and presentation technologies. In particular, by locally storing digital content on an electronic device and dynamically determining which animation to present to a user, the systems and methods reduce network latency, as the digital animations may be accessed much faster, thus reducing the amount of time the user has to wait for the digital content to load, and also reducing or eliminating the load on the network. Further, digital content may still be presented in instances in which the device is not connected to or loses access to a network. Additionally, locally storing digital content results in better control over content playback, as the application may more precisely control the playback of digital content, thus allowing for smoother playback and more control over timing and transitions. Further still, locally storing digital content can reduce the amount of data that needs to be downloaded from a server, which is particularly useful for mobile devices with limited data plans. Moreover, when digital content is stored locally, there is no need or a reduced need to transmit certain data over a network, thus reducing the risk of interception or hacking.

The systems and methods contemplate the use of "Lottie" animations, which is a type of vector-based animation that is based in JavaScript Object Notation (JSON). Generally, Lottie animations may be scaled up or down without losing image quality, thus resulting in versatile use on devices with different screen sizes. Further, Lottie animations have smaller file sizes compared to other file types, such as GIF or MP4, while still maintaining high-quality animations, thus enabling easy downloading to and loading on an electronic device. Additionally, Lottie animations can be interactive which enables users to interact with them in real-time, and are created using code rather than traditional animation software, which means that they can be easily integrated into a codebase, thus allowing for more control and flexibility when integrating animations into an application. Moreover, Lottie animations are easy to edit, thus enabling developers to efficiently make changes to animations without needing to use an animation software or graphic designer, and offer cross-platform compatibility which makes them useful for creating animations that work across different devices and platforms without the need to create multiple versions of the animation. It should be appreciated that different types of digital animations associated with the systems and methods are envisioned.

Generally, the systems and methods increase user engagement which is beneficial for application and/or website operators, for a number of reasons. In particular, when users engage more frequently and deeply with a website or application, it often translates into increased revenue for the operator, as the operator may gain valuable insights into user behavior which may be used to improve the website or application and optimize user engagement strategies, resulting in even greater benefits over time. Further, the more engaged users are with a website or application, the more likely they are to continue using it over the long term, and which may lead to improved user retention rates. Additionally, websites or applications that are designed to increase user engagement often offer a more enjoyable and rewarding user experience, which may result in users feeling more positively about the operator and the brand, leading to increased customer satisfaction and loyalty. Moreover, the systems and methods vary the display of digital animations by tying the digital animations to both reward levels and rarity probabilities, which increases the randomness of the digital animation display, builds value through scarcity, and increases user engagement with the application or website. It should be appreciated that additional benefits are envisioned.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of electronic devices 103, 104, 105 which may be used or operated by a set of users, such as any individual or person who may be interested in purchasing items, products, and/or services (generally, as used herein, "products") that may be offered for sale by an entity. In an embodiment, the entity may be a corporation, company, partnership, retailer, wholesaler operating on behalf of another entity (e.g., a white label wholesaler), or the like, where the entity may offer an ecommerce platform (e.g., a website accessible by or an application executable by the electronic devices 103, 104, 105) and/or a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a server computer 115 via one or more networks 110. The server computer 115 may be associated with an entity (e.g., a corporation, company, partnership, or the like) that may manage and facilitate digital rewards and/or offers for users, such as the set of users associated with the electronic devices 103, 104, 105. In particular, the server computer 115 may include or support a web server configured to host a website which with the electronic devices 103, 104, 105 may interface, such as to communicate indications of the purchase of any products, goods, and/or services, to receive reviews for the products, goods, and/or services, to present a set of digital offers related to a set of products, and/or to present digital animations or other visual content. For instance, a set of users of the set of electronic devices 103, 104, 105 may capture one or more digital images (e.g., using an image sensor of the electronic devices 103, 104, 105) of a receipt(s) indicating a set of products that were purchased by the users, either within a brick and mortar store or via an ecommerce platform, or another purchasing channel.

Further, the server computer 115 may support a software application executable by the set of electronic devices 103, 104, 105 (i.e., the set of electronic devices 103, 104, 105 may interface with the server computer 115 in executing the software application), where the user may use the software application to communicate information indicative of product purchases, and where the software application may notify of product rewards and display digital animations. Additionally, the users of the electronic devices 103, 104, 105 may have an account with a service or application offered by the server computer 115. In embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

The server computer 115 may be configured to interface with or support a memory or storage 113 capable of storing various data, such as in one or more databases or other forms of storage. According to embodiments, the storage 113 may store data or information associated with any products or services that are offered for sale by an entity, including any purchase history(ies) of a set of users, any reviews of products/services provided by users, and/or other data. Further, the storage 113 may store a set of digital animations that may presented by the set of electronic devices 103, 104, 105 in association with earning rewards for the purchase of products. According to embodiments, the set of digital animations stored by the storage 113 may be updated, added to, and/or deleted from, such as by an administrator associated with the server computer 115.

The server computer 115 may communicate with one or more data source(s) 106 via the network(s) 110. In embodiments, the data source(s) 106 may be associated with any company involved in the development, manufacture, distribution, and/or sales of one or more products. For example, the company may be a CPG company, private label brand company, direct-to-consumer (DTC) company, e-commerce marketplace provider, local/specialty retailer, and/or the like. Generally, each company associated with the data source(s) 106 may be interested in marketing campaigns for its products, such as to raise brand awareness, differentiate its products from competitors, generate sales, build customer loyalty, and introduce new products, among other reasons.

According to embodiments, each company associated with the data source(s) 106 may look to offer a set of digital offers to individuals (e.g., the users of the electronic devices 103, 104, 105). For example, a digital offer may be associated with a discount (percentage discount or monetary discount), free sample, bundle, cashback offer, subscription service, referral program, contest or sweepstakes, gift card, loyalty points, exclusive content, real life or virtual experience, and/or the like. Generally, a digital offer(s) may be intended to increase sales, attract new consumers, retain existing consumers, and launch a new product, among other purposes.

The set of electronic devices 103, 104, 105 may provide, to the server computer 115, data indicating a set of products purchased by the set of individuals associated with the set of electronic devices 103, 104, 105. In embodiments, the data source(s) 106 may store data indicating product purchases by individuals associated with the set of electronic devices 103, 104, 105. In this regard, the data source(s) 106 may be associated with an e-mail provider, an ecommerce retailer, or another component or entity, and the server computer 115 may retrieve this data from the data source(s) 106. The server computer 115 may examine this provided data to identify the set of products as well as determine a reward associated with the purchase of the set of products, where the reward may have associated a reward level or tier. The server computer 115 may communicate an indication of the reward and/or its reward level to the set of electronic devices 103, 104, 105, which may present a digital animation that corresponds to the reward and/or its reward level. Additional aspects of these functionalities are described with respect to the other figures.

Although depicted as a single server computer 115 in FIG. 1A, it should be appreciated that the server computer 115 may be in the form of a distributed cluster of computers, servers, machines, cloud-based services, or the like. In this implementation, the entity may utilize the distributed server computer(s) 115 as part of an on-demand cloud computing platform. Accordingly, when the electronic devices 103, 104, 105 interface with the server computer 115, the electronic devices 103, 104, 105 may actually interface with one or more of a number of distributed computers, servers, machines, or the like, to facilitate the described functionalities.

Further, although three (3) electronic devices 103, 104, 105, and one (1) server computer 115 are depicted in FIG. 1A, it should be appreciated that greater or fewer amounts are envisioned. For example, there may be multiple server computers, each one associated with a different entity.

Figure 2:
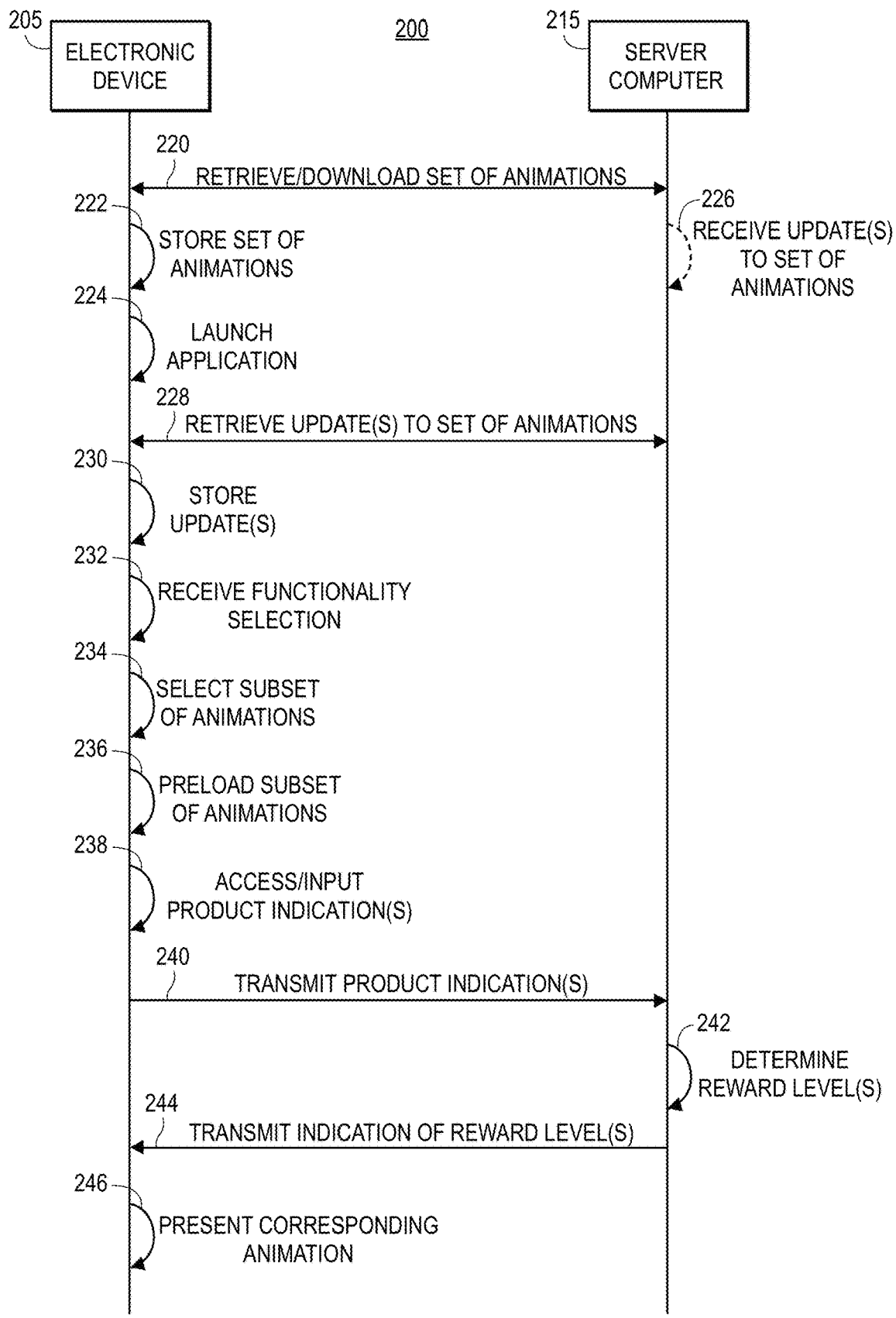
FIG. 2 depicts an example signal diagram detailing the functionalities of the systems and methods, in accordance with some embodiments.

FIG. 2 depicts a signal diagram 200 of various functionalities associated with the described embodiments. The signal diagram 200 may include an electronic device 205 (such as one of the electronic devices 103, 104, 105 as described with respect to FIG. 1) and a server computer 215 (such as the server computer 115 as described with respect to FIG. 1. Although a single electronic device and a single server computer are depicted in and described with respect to FIG. 2, it should be appreciated that multiple electronic devices that may each interface with one or more server computers are envisioned. In embodiments, the server computer 215 may be associated with an entity that develops and/or operates an application configured to provide digital rewards to users, and the electronic device 205 may be associated with a user who uses the application, where the electronic device 205 and the server computer 215 may communicate via a network connection. Although the functionalities are described with respect to a purchase of a product, it should be appreciated that the functionalities may alternatively or additionally apply to the purchase of a service (e.g., a haircut, a manicure, etc.).

The signal diagram 200 may begin at 220 when the electronic device 205 retrieves/downloads a set of animations from the server computer 215. According to embodiments, the set of animations may be bundled with an application and thus, when the electronic device 205 downloads the application, the electronic device may 205 also download the set of animations. In this scenario, the electronic device 205 may download the application and the set of animations from an application store operated by a third party entity. Alternatively, the electronic device 205 may retrieve/download the set of animations separately from downloading and installing the application that uses the set of animations.

The electronic device 205 may locally store (222) the set of animations, for example as part of a set of application data. In embodiments, each of the set of animations may be a Lottie animation that is composed of a JSON file, where each JSON file may contain all the animation data, including the keyframes, animations, and timing information. The JSON file may also contain information about the assets used in the animation, such as images and fonts. Further, each JSON file may be vector-based and may thus use mathematical equations to describe the shapes and movements in the animation, rather than storing every individual pixel.

The electronic device 205 may launch (224) or execute the application, such as in response to the user selecting to launch or execute the application. In an optional embodiment, the server computer 215 may receive (226) an update (s) to the set of animations associated with the application. In particular, any existing animations may be updated, such as in the form of an updated JSON file, and/or any animations may be added to or removed from the set of animations. For example, if a given holiday is approaching, one or more animations that may be related to that given holiday may be added to the set of animations that is available via the server computer 215.

In response to the application launching on the electronic device 205, the electronic device 205 may retrieve (228) any updates to the set of animations. In particular, the electronic device 205 may query the server computer 215 for any updates (such as the updates that may be received at (226)), and may download the updates if present. The electronic device may store (230) the updates, for example as part of the set of application.

At 232, the electronic device may receive a selection of a certain functionality of the application. In particular, the functionality may be associated with initiating a feature that is involved in the awarding of digital rewards. For example, the functionality may be a selection of a "scan a receipt" feature within the application, which enables the electronic device 205 to capture images of a receipt indicating a set of products purchased by the user. For further example, the functionality may correspond to the application accessing an electronic document indicating a set of products purchased by the user, for example from an electronic communication such as a text message or e-mail, or from another source.

In response to receiving the functionality selection in (232), the electronic device 205 may select (234) a subset of the set of animations. According to embodiments, the amount of selected animations in the subset may be equal to an amount of reward levels or tiers that are specified in association with the reward functionality of the application. In particular, a given product that is purchased by the user and for which the user wishes to receive a digital reward may have associated a reward level (or, in some cases, a value that is slotted into a given reward level).

Figure 3A:
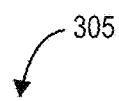
FIGS. 3A and 3B depict example tables associated with selecting digital animations, in accordance with some embodiments.

FIG. 3A illustrates a table 305 indicating a set of reward levels associated with digital rewards that may be awarded to users. As illustrated in FIG. 3A, the table 305 includes six (6) levels (I, II, III, IV, V, and Personal Record) and, for each level, a range of points corresponding to that level. Further, the table 305 indicates a probability of a digital animation being presented by a given electronic device for the corresponding level. According to embodiments, the points may be associated with products that may be purchased by the user. For example, a tube of toothpaste may have an associated value of twenty (20) points, a bottle of mouthwash may have an associated value of fifty (50) points, and a high-end container of moisturizer may have an associated value of three thousand (3,000) points. It should be appreciated that a point level for each of a given set of products may be set (and/or revised/updated) by or at the server computer 215.

For example, Level I (306) corresponds to a point value range of 0-25 and has a logarithmic probability (in particular, $1+\log_{10} (day/24)*0.756$; where "day" represents an amount of days that has passed since the user was last presented with a digital animation) of presenting a digital animation, Level II (307) corresponds to a point value range of 26-99 and also has a logarithmic probability (in particular, $1+\log_{10} (day/9)*0.636$; where "day" represents an amount of days that has passed since the user was last presented with an animation) of presenting a digital animation, and Level IV (308) corresponds to a point value of 1000-3000 and has a 100% probability of presenting a digital animation. For the "Personal Record" tier (309), the probability of presenting a digital animation may be 100% assuming that the user sets a personal record for amount of points earned.

According to embodiments, there may be one or more digital animations that is associated with each reward level. Additionally, each digital animation may have a relative degree of rarity associated with how often it is presented to users. For example, a first 3-second digital animation depicting fireworks may be presented to users more often than a second 10-second digital animation depicting confetti and streamers.

Figure 3B:
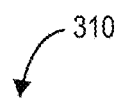

FIG. 3B illustrates a table 310 that indicates different rarities of digital animations that may be associated with each reward level. The table 310 includes the same six (6) levels (I, II, III, IV, V, and Personal Record) as the table 305 illustrated in FIG. 3A, and additionally indicates relative rarities of the associated digital animations (as shown: common, uncommon, rare, and epic). Further, the table 310 indicates percentages associated with the different rarity levels, where the percentages correspond to the probabilities of a given digital animation from a given rarity level being presented to a user.

For example, for Level I (311), a common rarity animation is presented 100% of the time; for Level III (312), a common rarity animation is presented 77% of the time, an uncommon rarity animation is presented 18% of the time, and a rare rarity animation is presented 5% of the time; and for Level V (313), a common rarity animation is presented 76% of the time, an uncommon rarity animation is presented 18% of the time, a rare rarity animation is presented 5% of the time, and an epic rarity animation is presented 1% of the time. It should be appreciated that the percentages may be set, configured, revised, and/or update at the server computer 215 (or in some cases, by the application executing on the electronic device 205).

It should be appreciated that each rarity level, for each reward level, may have associated one or more different animations. For example, for reward Level I (311) as illustrated in FIG. 3B, there may five (5) different common rarity animations (and no other animations as only common animations are presented for this reward level); for reward Level III (312) as illustrated in FIG. 3B, there may be four (4) different common rarity animations, three (3) different uncommon rarity animations, and two (2) different rare rarity animations; and for reward Level V (313) as illustrated in FIG. 3B, there may be five (5) different common rarity animations, four (4) different uncommon rarity animations, two (2) different rare rarity animations, and one (1) epic rarity animation.

It should be appreciated that the different animations may overlap (or may not overlap) among the different reward tiers and/or among the different rarity levels. For instance, the common rarity animations for Level I (311) may (or may not) overlap with the common rarity animations for Level III (312) and Level V (312). For further instance, a rare rarity animation for Level III (312) may be an uncommon rarity animation for Level V (313).

Thus, in selecting (234) the subset of the set of animations, the electronic device 205 may select an animation from each of the reward tiers and according to the rarity level probabilities. For example, according to the table 310 of FIG. 3B, the electronic device 205 may select one of the common rarity animations for Level I (for which there was a 100% chance of selection), one of the common rarity animations for Level II (for which there was a 90% chance of selection), one of the uncommon rarity animations for Level III (for which there was an 18% chance of selection), one of the common rarity animations for Level IV (for which there was a 77% chance of selection), one of the epic rarity animations for Level V (for which there was a 1% chance of selection), and one of the common rarity animations for the Personal Record tier (for which there was a 100% chance of selection).

The electronic device may preload (236) each of the subset of animations. In embodiments, an animation (e.g., a Lottie animation) can be preloaded and run prior to the corresponding animation being presented on the electronic device 205, which may improve the user experience by reducing the delay between when the animation is triggered and when it starts playing on the screen. In preloading a given animation, the electronic device 205 may start the animation and immediately pause it, thus loading the animation data into memory and preparing it for later playback, where the playback may be trigged by a given function.

The electronic device may access or input (238) an indication(s) of a product(s) that may be purchased by a user of the electronic device 205. According to embodiments, the functionality of (238) may be initiated by the user selecting a feature or functionality of the application (e.g., a feature to capture images of receipts).

In an embodiment, a user of the electronic device 205 may capture one or more digital images (e.g., using an image sensor of the electronic device 205) of a receipt(s) indicating a set of products that were purchased by the user, either within a brick and mortar store or via an ecommerce platform, or another purchasing channel. The receipt(s) may be a physical printed receipt or may be a digital receipt that may be displayed by the electronic device 205 (where the electronic device may capture the digital receipt via, for example, a screenshot).

The electronic device 205 may transmit (240) the product indication(s) (e.g., the receipt image(s)) to the server computer 215, such as via a network connection. In another embodiment, the server computer 215 may interface with another device, such as a third party server, that stores data identifying a purchase history of a user(s) associated with the electronic device 205. For example, the third party server may be associated with an ecommerce platform or site that offers various products for purchase. For further example, the third party server may be an e-mail provider that receives and stores (e.g., in a user inbox) order confirmations indicating a purchase(s) made by a user(s) of the e-mail provider.

The server computer 215 may identify a set of products that was purchased, such as from the product indication(s) that was transmitted in (240) and/or from a third party server that supplies data identifying a set of purchased products. The server computer 215 may identify the set of products that was purchased from one or more identifiers, such as a barcode, UPC, ISBN, GTIN, EAN, or other identification, where the identifier(s) may be included on an image of a receipt or on a confirmation of a purchase of a product(s). In embodiments, the server computer 215 may perform one or more image recognition techniques on any receipt image(s) received from the electronic device 205, to identify a set of products that is identified on the receipt image(s).

In this regard, the server computer 215 may have access to the purchase history (i.e., as identified on the receipt image(s) or from a third party server), analyze the purchase history, and identify any product(s) included in the purchase history and therefore purchased by the user. It should be appreciated that one or more of the products that may be identified from a given user's purchase history, e-mail, digital image, or the like may not have been physically or actually purchased by the given user, however by virtue of the one or more products being associated with the given user's purchase, history, e-mail, digital image, or the like, the server computer 215 may deem that the one or more products was purchased by the given user.

Additionally, the server computer 215 may determine (242) a reward level associated with any product that is deemed as purchased by the user of the electronic device 205. According to embodiments, a given product may have a given number of points or similar metric associated therewith, where the given number of points may be configured by or otherwise available to the server computer 215. For example, a case of sparkling water may have an associated point value of twenty five (25) points and a stick of deodorant may have an associated point value of seventy five (75) points.

The point value for a product may also have a reward level associated therewith. The table 305 as illustrated in FIG. 3A indicates the set of reward levels, each of which has a point value or range of point values associated therewith. For example, as depicted, Level I (306) has a range of point values from 0-25 and Level II (307) has a range of point values from 26-99.

In an embodiment, the server computer 215 may determine a reward level for each product (and its corresponding amount of points) that is included in the product indication (s) transmitted in (240). For example, based on the table 305 of FIG. 3A, the server computer 215 may determine that the case of sparkling water (25 points) is associated with Level I (306) and the stick of deodorant (75 points) is associated with Level II (307). In another embodiment, the server computer 215 may determine a reward level for a cumulative amount of points for all of the products that are included in the product indications(s) transmitted in (240). For example, based on the table 305 of FIG. 3A, the server computer 215 may determine that the cumulative value for the case of sparkling water (25 points) and the stick of deodorant (75 points) is one hundred (100) points, and therefore the reward level for the combination of the products is Level III.

Although not illustrated in FIG. 2, the server computer 215 may apply, to an account of the user associated with the electronic device 205, a set of rewards associated with the purchased product(s). For example, each purchased product may have an amount of points (or other reward metric) that is applied to the account of the given user.

The server computer 215 may transmit (244) an indication of the reward level(s) to the electronic device 205. In embodiments, there may be a single reward level or multiple reward levels (e.g., in the event of multiple products, each of which corresponding to a different reward level). For example, based on the table 305 of FIG. 3A, if the identified product is a 20 oz water bottle having a point value of 2000 points, the server computer 215 may transmit an indication of reward Level IV (308).

The electronic device 205 may present (246) an animation in a user interface. In particular, the electronic device 205 may identify, from the subset of animations that was selected in (234), an animation(s) that corresponds to the reward level(s) transmitted in (244). To continue with the example previously provided, where, according to the table 310 of FIG. 3B, one of the common rarity animations was selected for Level I, one of the common rarity animations was selected for Level II, one of the uncommon rarity animations was selected for Level III, one of the common rarity animations was selected for Level IV, one of the epic rarity animations was selected for Level V, and one of the common rarity animations was selected for the Personal Record tier, and the reward level received from the server 215 indicates Level III, the electronic device 205 may identify and present the uncommon rarity animation that was selected for Tier III.

According to embodiments in which each of the subset of animations is preloaded in the memory, the electronic device 205 may present the animation using a portion of the data corresponding to the animation to be presented that was preloaded in the memory. In presenting the animation, the electronic device 205 may use an animation library, and load the animation into a container element in the user interface, and use code to play the animation within the container element, which may involve using hardware acceleration to ensure smooth and fluid playback. Depending on the specific library and platform, the electronic device may customize various aspects of the presentation of the animation, such as its size, position, playback speed, loop behavior, and interaction with other elements presented in the user interface. Further, the electronic device 205 may control the appearance of the animation by modifying its colors, opacity, and other visual properties using cascading style sheets (CSS) or other styling techniques.

Generally, the appearance of the animation when presented on the user interface can vary depending on the specific animation design and how it is implemented in the application. In particular, a given animation can include complex visual effects, such as gradients, shadows, and masks, as well as animations of various types, such as motion graphics, illustrations, and icons. Further, the animation may also include interactive elements, such as buttons or clickable hotspots, that allow users to interact with the animation or trigger certain actions within the application. Although the present embodiments describe the display of digital animations, it should be appreciated that the systems and methods may alternatively render different static digital images and/or other digital content that may correspond to different reward levels.

FIGS. 4A-4F illustrate example interfaces that may be displayed on a user interface of an electronic device (such as the electronic device 205 as discussed with respect to FIG. 2). In embodiments, the interfaces may be associated with an application executable by, or a website accessed by, the electronic device (as generally used herein, an "application"). Further, the interfaces may be specific to a user of the electronic device, where the user may access the interfaces by logging into an account or via another type of access. It should be appreciated that the content of the interfaces is exemplary, and that alternative or additional content is envisioned.

Figure 4B:
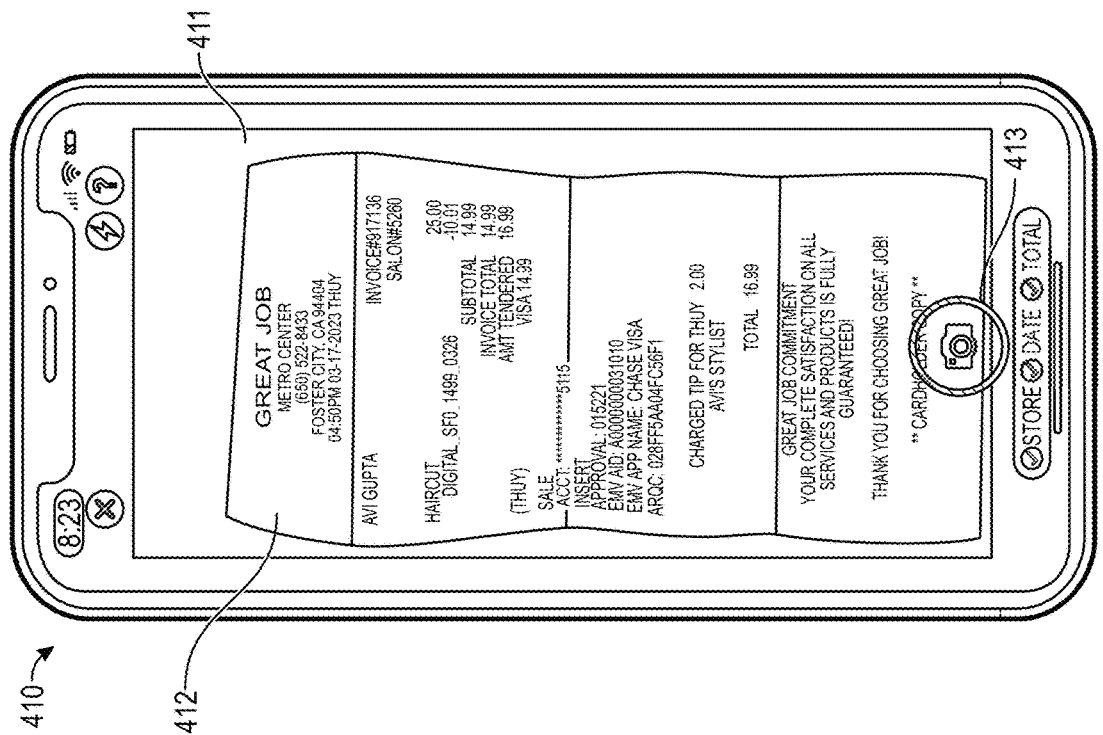
FIGS. 4A-4F are example interfaces illustrating various features of the systems and methods, in accordance with some embodiments.
Figure 4A:
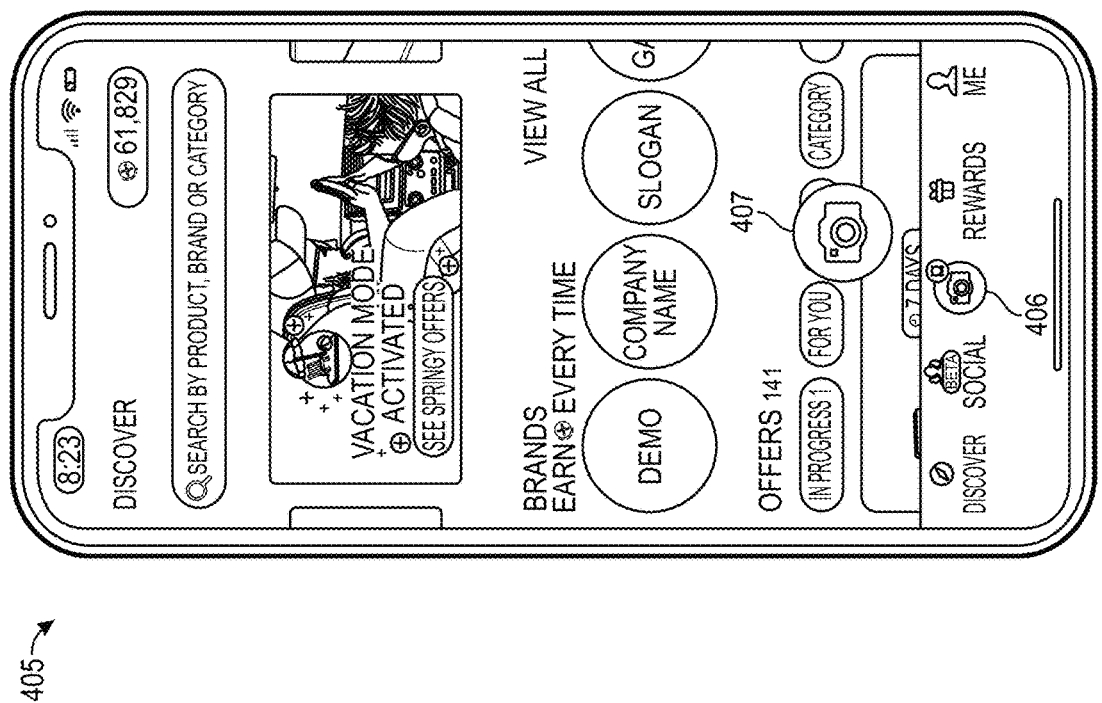

FIG. 4A illustrates an interface 405 depicting a set of functionalities associated with the application. In particular, the interface 405 includes a capture selection 406 that, upon selection, causes the interface 405 to display a scan selection 407. In response to the user selecting the scan selection 407, the electronic device may display an interface 410 as depicted in FIG. 4B.

The interface 410 of FIG. 4B enables the user to capture an image of a receipt that indicates a purchase of a set of products. In particular, the interface 410 includes a "live view" window 411 that indicates the image data that an image sensor of the electronic device may capture or generate. The user may position a receipt 412 within the window 411, and may select to cause the electronic device to capture a digital image of the receipt 412 by selecting a capture selection 413. As illustrated in FIG. 4B, the receipt 412 indicates that the user purchased a haircut.

Figure 4D:
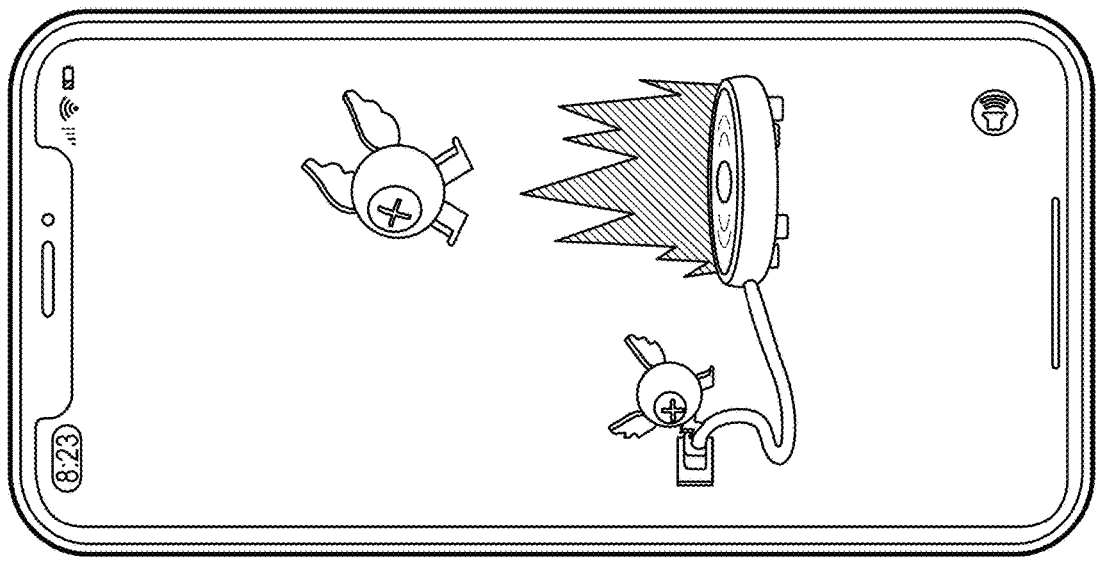
Figure 4C:
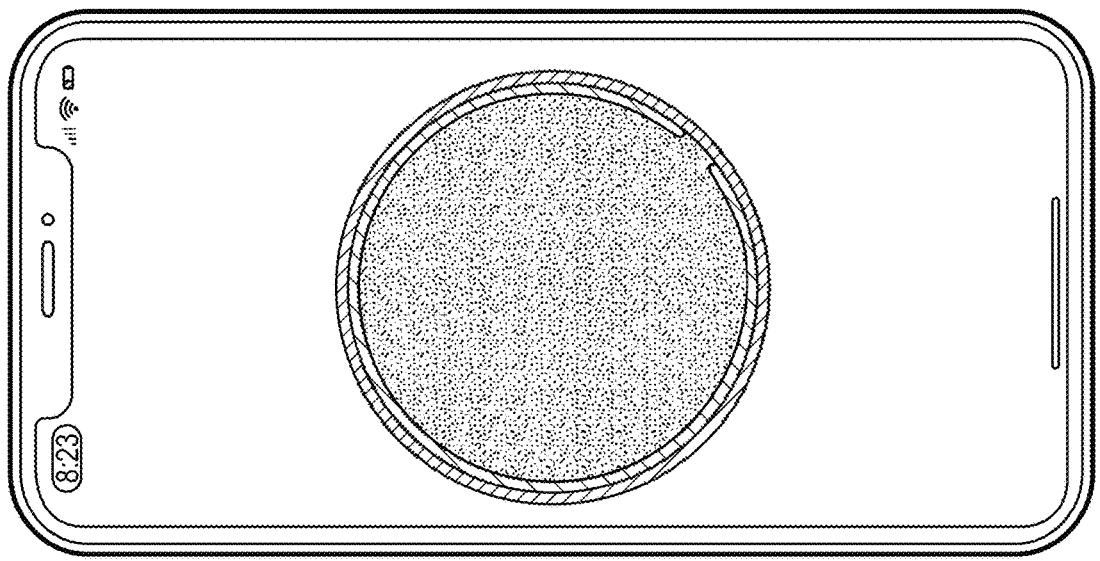

In response to the user selecting the capture selection 413 or in response to another trigger (e.g., the user selecting to upload the digital image), the electronic device may upload the captured digital image to a server. FIG. 4C illustrates an interface 415 depicting that the receipt image is being uploaded. According to embodiments, the server may analyze the receipt image, identify the purchased product or service (i.e., the haircut), and determine a reward level associated with the purchased product or service. Separately, the electronic device may select and optionally pre-load any animation files respectively corresponding to a set of reward levels.

The server may additionally communicate, to the electronic device, an indication of the reward level as well as a reward value associated with the purchased product or service. In response to receiving the indication of the reward level and reward value, the electronic device may display an interface 420 as illustrated in FIG. 4D, where the interface 420 displays a frame of an animation that corresponds to the reward level as communicated by the server. FIG. 4E illustrates an interface 425 that displays an additional frame of the animation that corresponds to the reward level as communicated by the server. Although FIGS. 4D and 4E depict individual image frames of the animation, it should be appreciated that the animation may include a sequence of frames that is stored in a file as discuss herein.

Figure 4F:
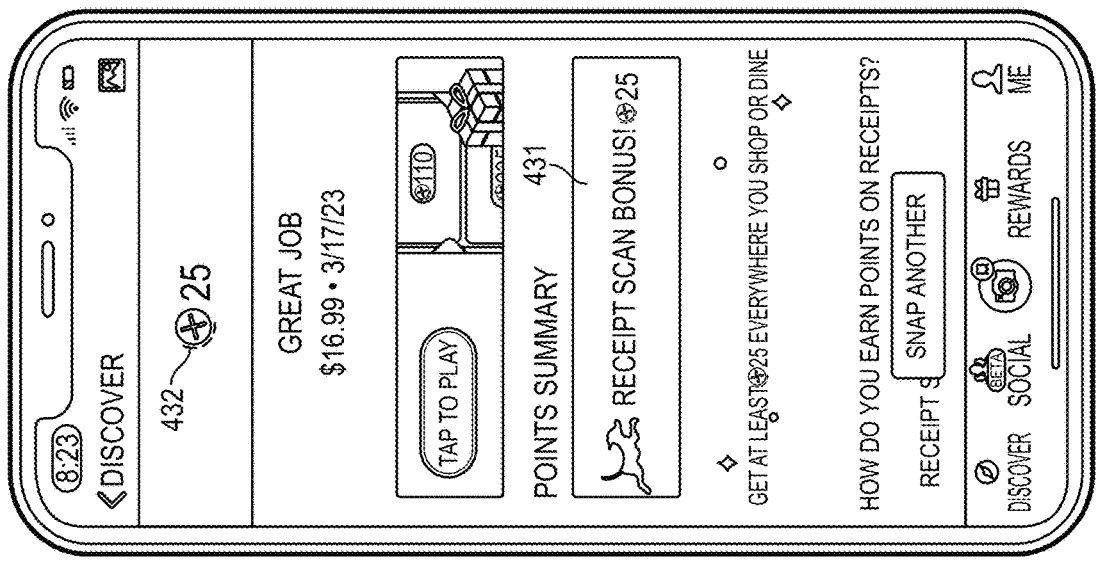
Figure 4E:
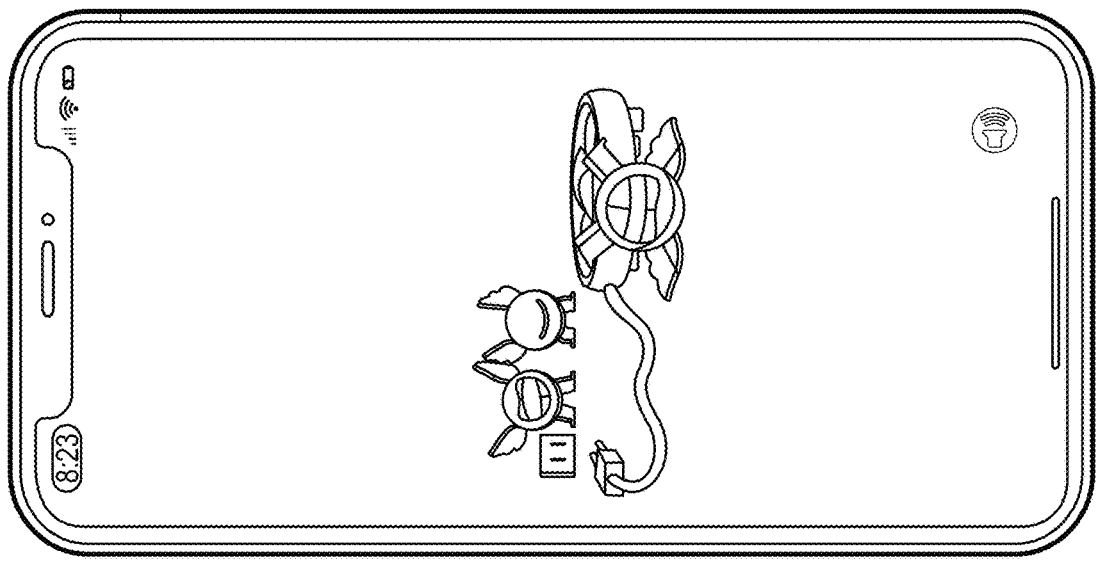

After displaying the animation as depicted in FIGS. 4D and 4E (or, in some cases, before displaying the animation as depicted in FIGS. 4D and 4E), the electronic device may display an interface 430 as depicted in FIG. 4F. In particular, the interface 430 may indicate (431) that the user has been awarded with twenty-five (25) points. The twenty-five (25) point reward may further be applied to an account of the user, as reflected by element 432 of FIG. 4F.

Figure 5:
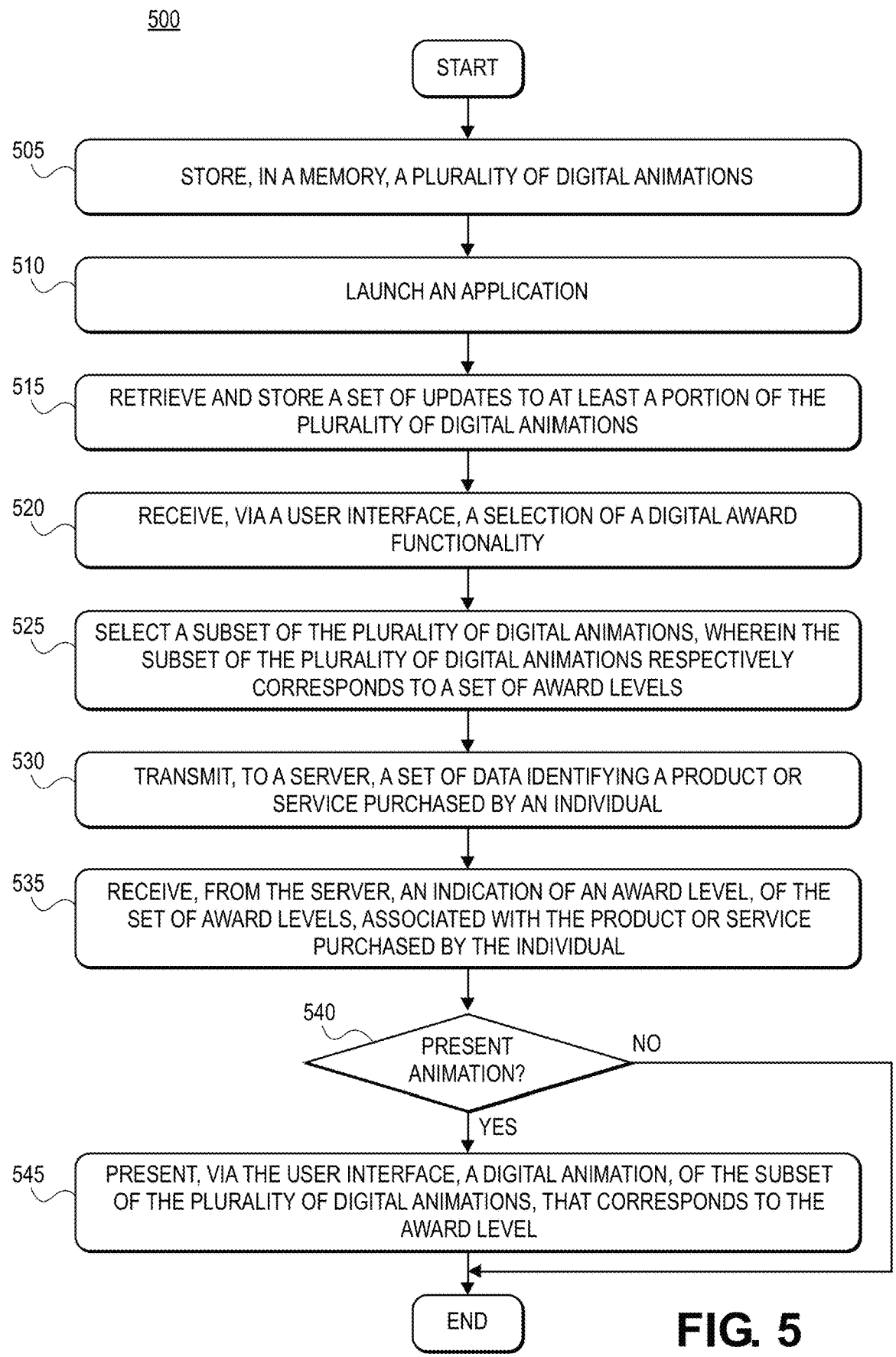
FIG. 5 illustrates an example flow diagram of presenting digital animations, in accordance with some embodiments.

FIG. 5 is a block diagram of an example method 500 in an electronic device of presenting digital animations. The method 500 may be facilitated by the electronic device (such as the electronic device 205 as discussed with respect to FIG. 2) or other type of electronic device.

The method 500 begins at block 505 in which the electronic device stores, in memory, a plurality of animations. In embodiments, the plurality of animations may be bundled with an application that the electronic device downloads from an application store and locally stores for execution. Further, in embodiments, each of the plurality of digital animations may be an electronic file comprising animation data in a vector format.

At block 510, the electronic device may launch the application. In response to launching the application, the electronic device may, at block 515, retrieve and store a set of updates to at least a portion of the plurality of digital animations. In embodiments, there may not be any available updates to the plurality of digital animations. At block 520, the electronic device may receive, via a user interface, a selection of a digital reward functionality that may be associated with the application.

In response to receiving the selection of the digital reward functionality, at block 525, the electronic device may select a subset of the plurality of digital animations, wherein the subset of the plurality of digital animations respectively corresponds to a set of reward levels. In embodiments, for each of the set of reward levels, the electronic device may identify a set of applicable rarity levels, and select, from at least a portion of the plurality of digital animations associated with that reward level, an initial digital animation based on a set of probabilities associated with the set of applicable rarity levels for that reward level. In embodiments, the electronic device may load, in the memory, data associated with the subset of the plurality of digital animations.

At block 530, the electronic device may transmit, to a server, a set of data identifying a product or service purchased by an individual. In embodiments, the electronic device may capture, using an image sensor, a set of digital image data identifying the product or service purchased by the individual, and transmit, to the server, the set of digital image data.

At block 535, the electronic device may receive, from the server, an indication of an reward level, of the set of reward levels, associated with the product or service purchased by the individual. At block 540, the electronic device may determine, based on a probability associated with the reward level, whether to present a digital animation. If the electronic device determines to not present the digital animation ("NO"), processing may end, repeat, or proceed to other functionality. If the electronic device determines to present the digital animation ("YES"), the electronic device may present (block 545), via the user interface, the digital animation, of the subset of the plurality of digital animations, that corresponds to the reward level. In embodiments in which the electronic device previously loads, in memory, data associated with the subset of the plurality of digital animations, the electronic device may present the digital animation using at least a portion of the data that was loaded in the memory.

FIG. 6 illustrates a hardware diagram of an example electronic device 601 (e.g., one of the electronic devices 103, 104, 105, 205 as described with respect to FIGS. 1 and 2) and an example server 615 (e.g., one of the server computers 115, 215 as described with respect to FIGS. 1 and 2), in which the functionalities as discussed herein may be implemented. It should be appreciated that the components of the electronic device 601 and the server 615 are merely exemplary, and that additional or alternative components and arrangements thereof are envisioned.

The electronic device 601 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a product rewards application 690, such as to communicate indications of purchased products or services, manage rewards accounts, display digital animations, and/or facilitate other functionalities. It should be appreciated that one or more other applications 692 are envisioned.

The processor 672 may interface with the memory 678 to execute the operating system 679 and the set of applications 675. According to some embodiments, the memory 678 may also store other data 680, such as digital animation file data, account information, and/or other data. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 601 may further include a communication module 677 configured to communicate data via one or more networks 610. According to some embodiments, the communication module 677 may include one or more transceivers (e.g., WAN, WWAN, WLAN, and/or WPAN transceivers) functioning in accordance with IEEE standards, 3GPP standards, or other standards, and configured to receive and transmit data via one or more external ports 676.

The electronic device 601 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 601 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, and/or built in or external keyboard). Additionally, the electronic device 601 may include a speaker 673 configured to output audio data and a microphone 674 configured to detect audio.

In some embodiments, the electronic device 601 may perform the functionalities as discussed herein as part of a "cloud" network or may otherwise communicate with other hardware or software components within the cloud to send, retrieve, or otherwise analyze data.

As illustrated in FIG. 6, the electronic device 601 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a product rewards application 652, such as to analyze indications of purchased products or services, manage rewards accounts, determine reward tiers, and/or facilitate other functionalities. It should be appreciated that one or more other applications 653 are envisioned.

The processor 659 may interface with the memory 656 to execute the operating system 657 and the set of applications 651. According to some embodiments, the memory 656 may also store other data 658, such as digital animation data, product or service data, rewards information, account data, and/or other data. The memory 656 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WAN, WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs, external or built in keyboard). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method in an electronic device of presenting digital animations, the computer-implemented method comprising:

launching, by a computer processor of the electronic device, a software application;

in response to launching the software application, retrieving, by the computer processor from a remote server, a set of updates associated with a plurality of digital animations;

locally storing, by the electronic device, the set of updates associated with the plurality of digital animations, wherein there are multiple digital animations of the plurality of digital animations associated with each of a plurality of reward levels, and wherein each digital animation of the plurality of digital animations is an electronic file comprising animation data in a vector format;

capturing, by an image sensor of the electronic device, a digital image, wherein the digital image depicts alphanumeric text;

selecting, by the computer processor, one digital animation of the multiple digital animations for each reward level of the plurality of reward levels;

for each digital animation that was selected:
preloading, by the computer processor, that digital animation into memory, and
programmatically starting and pausing that digital animation that was preloaded;

transmitting, by the computer processor to the remote server, the digital image depicting the alphanumeric text, wherein the remote server performs an image recognition technique on the digital image to identify, from the alphanumeric text depicted in the digital image, a purchase made by an individual;

identifying a digital animation, of the digital animations that were programmatically started and paused, that corresponds to a reward level, of the plurality of reward levels, associated with the purchase made by the individual;

loading, by the computer processor using an animation library, the digital animation into a container element in a user interface of the electronic device; and programmatically presenting, within the container element in the user interface, the digital animation that was loaded, wherein the digital animation being preloaded into the memory reduces a delay between when the digital animation is identified and when the digital animation is programmatically presented.

2. The computer-implemented method of claim 1, wherein retrieving the set of updates associated with the plurality of digital animations comprises:

retrieving, by the computer processor from the remote server, the set of updates to at least a portion of the plurality of digital animations.

3. The computer-implemented method of claim 1, wherein retrieving the set of updates associated with the plurality of digital animations comprises:

retrieving, by the computer processor from the remote server, a set of additional digital animations to add to the plurality of digital animations.

4. The computer-implemented method of claim 1, further comprising:

prior to launching the software application, locally storing, by the electronic device, the plurality of digital animations.

5. The computer-implemented method of claim 1, further comprising:

prior to identifying the digital animation, receiving, by the computer processor from the remote server, an indication of the reward level, of the plurality of reward levels, associated with the purchase made by the individual.

6. The computer-implemented method of claim 1, wherein capturing the digital image comprises:

receiving, via the user interface, a selection of a digital reward functionality of the software application; and in response to receiving the selection, capturing, by the image sensor, the digital image.

7. The computer-implemented method of claim 1, wherein selecting the one digital animation of the multiple digital animations for each reward level of the plurality of reward levels comprises:

for each reward level of the plurality of reward levels:
identifying a set of applicable rarity levels, and
selecting, from the multiple digital animations of the plurality of digital animations associated with that reward level, an initial digital animation based on a set of probabilities associated with the set of applicable rarity levels for that reward level.

8. The computer-implemented method of claim 1, wherein programmatically presenting the digital animation comprises:

determining, based on a probability associated with the reward level, to present the digital animation; and in response to determining to present the digital animation, programmatically presenting, within the container element in the user interface, the digital animation that was loaded.

9. An electronic device for presenting digital animations, comprising:

a memory storing a set of computer-readable instructions and a plurality of digital animations;
a user interface;
an image sensor;
a transceiver configured to connect to a remote server via a network connection; and
one or more processors interfaced with the memory, the image sensor, the transceiver, and the user interface, and configured to execute the set of computer-readable instructions to cause the one or more processors to:
launch a software application,
in response to launching the software application, retrieve, from the remote server via the transceiver, a set of updates associated with the plurality of digital animations,
locally store the set of updates associated with the plurality of digital animations, wherein there are multiple digital animations of the plurality of digital animations associated with each of a plurality of reward levels, and wherein each digital animation of the plurality of digital animations is an electronic file comprising animation data in a vector format,
cause the image sensor to capture a digital image, wherein the digital image depicts alphanumeric text,
select one digital animation of the multiple digital animations for each reward level of the plurality of reward levels,
for each digital animation that was selected:
preload that digital animation into the memory, and
programmatically start and pause that digital animation that was preloaded,
transmit, to the remote server via the transceiver, the digital image depicting the alphanumeric text, wherein the remote server performs an image recognition technique on the digital image to identify, from the alphanumeric text depicted in the digital image, a purchase made by an individual,
identify a digital animation, of the digital animations that were programmatically started and paused, that corresponds to a reward level, of the plurality of reward levels, associated with the purchase made by the individual,
load, using an animation library, the digital animation into a container element in the user interface, and
programmatically present, within the container element in the user interface, the digital animation that was loaded, wherein the digital animation being preloaded into the memory reduces a delay between when the digital animation is identified and when the digital animation is programmatically presented.

10. The electronic device of claim 9, wherein to retrieve the set of updates associated with the plurality of digital animations, the one or more processors is configured to:

retrieve, from the remote server via the transceiver, the set of updates to at least a portion of the plurality of digital animations.

11. The electronic device of claim 9, wherein to retrieve the set of updates associated with the plurality of digital animations, the one or more processors is configured to:

retrieve, from the remote server via the transceiver, a set of additional digital animations to add to the plurality of digital animations.

12. The electronic device of claim 9, wherein the one or more processors is configured to execute the set of computer-readable instructions to further cause the one or more processors to:
    prior to launching the software application, locally store the plurality of digital animations.

13. The electronic device of claim 9, wherein the one or more processors is configured to execute the set of computer-readable instructions to further cause the one or more processors to:
    prior to identifying the digital animation, receive, from the remote server via the transceiver, an indication of the reward level, of the plurality of reward levels, associated with the purchase made by the individual.

14. The electronic device of claim 9, wherein the one or more processors causes the image sensor to capture the digital image in response to receiving, via the user interface, a selection of a digital reward functionality of the software application.

15. The electronic device of claim 9, wherein to select the one digital animation of the multiple digital animations for each reward level of the plurality of reward levels, the at least one processor is configured to:
    for each reward level of the plurality of reward levels:
        identify a set of applicable rarity levels, and
        select, from the multiple digital animations of the plurality of digital animations associated with that reward level, an initial digital animation based on a set of probabilities associated with the set of applicable rarity levels for that reward level.

16. The electronic device of claim 9, wherein to programmatically present the digital animation, the one or more processors is configured to:
    determine, based on a probability associated with the reward level, to present the digital animation, and
    in response to determining to present the digital animation, programmatically present, within the container element in the user interface, the digital animation that was loaded.

17. A non-transitory computer-readable storage medium configured to store instructions executable by one or more processors of an electronic device, the instructions comprising:
    instructions for launching a software application executable by the electronic device;
    instructions for, in response to launching the software application, retrieving, from a remote server, a set of updates associated with a plurality of digital animations;
    instructions for locally storing, by the electronic device, the set of updates associated with the plurality of digital animations, wherein there are multiple digital animations of the plurality of digital animations associated with each of a plurality of reward levels, and wherein each digital animation of the plurality of digital animations is an electronic file comprising animation data in a vector format;
    instructions for capturing, by an image sensor of the electronic device, a digital image, wherein the digital image depicts alphanumeric text;
    instructions for selecting one digital animation of the multiple digital animations for each reward level of the plurality of reward levels;
    instructions for, for each digital animation that was selected:
        preloading that digital animation into memory, and
        programmatically starting and pausing that digital animation that was preloaded;
    instructions for transmitting, to the remote server, the digital image depicting the alphanumeric text, wherein the remote server performs an image recognition technique on the digital image to identify, from the alphanumeric text depicted in the digital image, a purchase made by an individual;
    instructions for identifying a digital animation, of the digital animations that were programmatically started and paused, that corresponds to a reward level, of the plurality of reward levels, associated with the purchase made by the individual;
    instructions for loading, using an animation library, the digital animation into a container element in a user interface of the electronic device; and
    instructions for programmatically presenting, within the container element in the user interface, the digital animation that was loaded, wherein the digital animation being preloaded into the memory reduces a delay between when the digital animation is identified and when the digital animation is programmatically presented.

18. The non-transitory computer-readable storage medium of claim 17, wherein the instructions for retrieving the set of updates associated with the plurality of digital animations comprise:
    instructions for retrieving, from the remote server, the set of updates to at least a portion of the plurality of digital animations.

19. The non-transitory computer-readable storage medium of claim 17, wherein the instructions for retrieving the set of updates associated with the plurality of digital animations comprise:
    instructions for retrieving, from the remote server, a set of additional digital animations to add to the plurality of digital animations.

20. The non-transitory computer-readable storage medium of claim 17, wherein the instructions further comprise:
    instructions for, prior to launching the software application, locally storing, by the electronic device, the plurality of digital animations.

* * * * *